US00RE43716E

(19) United States
(12) Reissued Patent
Wang

(10) Patent Number: US RE43,716 E
(45) Date of Reissued Patent: Oct. 2, 2012

(54) METHOD OF FAST SWITCHING CONTROL FOR DIFFERENT OPERATION SYSTEMS OPERATED IN COMPUTER

(75) Inventor: Szu-Chung Wang, Taipei (TW)

(73) Assignee: Getac Technology Corp., Hsinchu (TW)

(21) Appl. No.: 13/158,699

(22) Filed: Jun. 13, 2011

Related U.S. Patent Documents

Reissue of:
(64) Patent No.: 7,549,041
Issued: Jun. 16, 2009
Appl. No.: 11/302,241
Filed: Dec. 14, 2005

(30) Foreign Application Priority Data

Sep. 7, 2005 (TW) ..... 94130760

(51) Int. Cl.
*G06F 9/00* (2006.01)
(52) U.S. Cl. ..... 713/2; 713/1; 713/100
(58) Field of Classification Search ..... 713/1, 2, 713/100
See application file for complete search history.

(56) References Cited

U.S. PATENT DOCUMENTS

2001/0018717 A1 8/2001 Shimotono
2004/0237086 A1 11/2004 Sekiguchi et al.
2005/0182922 A1 8/2005 Guo et al.
2005/0216722 A1 9/2005 Kim et al.
2005/0273663 A1 12/2005 Yoon
2007/0022421 A1 1/2007 Lescouet et al.
2007/0055860 A1 3/2007 Wang

FOREIGN PATENT DOCUMENTS

CN 1673962 9/2005

OTHER PUBLICATIONS

Communication from the German Patent Office, dated Feb. 19, 2008.

*Primary Examiner* — Kim Huynh
*Assistant Examiner* — Paul Yanchus, III
(74) *Attorney, Agent, or Firm* — Finnegan, Henderson, Farabow, Garrett & Dunner, LLP

(57) ABSTRACT

A method of fast switching control for different operation systems operated in computer is provided, including installing a first operating system, a second operating system and a second operating system kernel program in a hard disk of the computer. An event signal generation unit is connected to the computer. When the computer completes the booting process, the first operating system is loaded and executed, the second operating system kernel program memory region is established in a system memory, and the second operating system kernel program is loaded into the second operating system kernel program memory region. When the computer detects that a preset event signal is generated from the event signal generation unit, the second operation system kernel program preloaded in the second operating system kernel program memory region is executed, so that the computer is switched from executing the first operation system to executing the second operation system.

18 Claims, 5 Drawing Sheets

METHOD OF FAST SWITCHING CONTROL FOR DIFFERENT OPERATION SYSTEMS OPERATED IN COMPUTER

Matter enclosed in heavy brackets [ ] appears in the original patent but forms no part of this reissue specification; matter printed in italics indicates the additions made by reissue.

*This application is a reissue application of U.S. Pat. No. 7,549,041 B2. This application claims priority to Taiwanese patent application no. 94130760, filed Sep. 7, 2005.*

FIELD OF THE INVENTION

The present invention relates to a control method for computer devices operated with multiple operation systems and, more particularly, to a fast switching control method for different operation systems operated within computers.

BACKGROUND OF THE INVENTION

The conventional method in computer technology is to install an operating system (OS) in a computer so that when the computer is booted, the OS, the device drivers, and the specified applications in a hard disk of the computer will be loaded and executed after the basic booting process.

As the computer becomes more powerful, the application fields become wider and wider, and different functions of computers are also developed by many computer manufacturers to meet the particle demands. For example, a typical application is to use a computer in conjunction with a multimedia player or a household appliance to become a well-performed computer system.

SUMMARY OF THE INVENTION

However, because the hardware structure and the functions are different between the computer and the multimedia player or household appliances, it is difficult for a computer system integrated with a multimedia player or appliances to be booted in a speed as fast as turning on-off switch of household appliances. Although the industrial suppliers have provided different operating systems for normal computer operation mode and multimedia mode operations, the computer system still needs to read the operating system from the hard disk at the beginning of the booting process before operating in the multimedia mode. That is, the user must boot the computer and wait for the computer to complete the basic input operation system (BIOS) activation, power on self test (POST), peripheral detection and driving, operation system activation, system configuration, and so on, and then execute the multimedia playing.

Traditionally, in order to speed up booting time of a personal computer, a second operation system is additionally installed in another partition of the original hard disk, so as to that it can provide the function of multimedia players or intelligent appliances and shortening booting time of the personal computer.

However, when the above method is adopted, it provides the choices to the user between executing the normal functions of computers and executing the functions multimedia player or intelligent appliances, but when the computer system begins to execute operation system and save data in hard disk, the speed of data saving will be limited seriously.

The primary objective of the present invention is to provide a method of fast switching control for different operation system being applicable to the computer. Through the present invention, the switching between more than two different operations systems installed in a computer can be speeded up effectively.

Another objective of the present invention is to provide a method of fast switching control for multiple operation systems being applicable to the computer. In the present invention, a second operation system kernel program memory region is arranged in the system memory, and the second operation system kernel program is loaded into the second operation system kernel program memory region. Through the operation of the second operation system kernel program memory region, the computer can operate fast when it is switched to the second operation system.

To realize the above objects, the present invention at least installs a first operation system, a second operation system and the second operation system kernel program in the hard disk of the computer. The hard disk is divided into a first partition and a second partition, with the first partition installs with the first operating system, and the second partition installs with the second operating system and the second operation system kernel program. When the computer completes the booting process with the first operation system, a second operation system kernel program memory region is established in the system memory, and the second operation system kernel program is loaded into the memory region. When the computer detects an event signal generated from the event generation unit, the second operation system kernel program preloaded from the second operation system kernel program memory region is executed, so that the computer is switched from executing the first operation system to executing the second operation system. The first operation system is windows operation system, and the second operation system is embedded operation system.

In the preferred embodiment of the present invention as above description, the operation sequence of the computer after booting process is loading and executing the first operation system, detecting the event signal, loading and executing the second operation system, and switching back to executing the first operation system. In actual applications, the operation sequence of the computer after booting process also may be loading and executing the second system, detecting the event signal, executing the second operation system, and switching back to the first operation system.

In comparison with the conventional technologies, the present invention allows the computer installs with two or more operation systems at meanwhile. When a user needs to conduct specified function, the computer can be switched from executing the first operation system to executing the second operation system through second operation system kernel program loaded from the second operation system kernel program memory region arranged in the system memory of computer. In actual applications, if the computer is integrated with an intelligent appliance (IA) or a multimedia playing function, the switching between the operations systems also achieves the switching between the functions of multimedia playing and intelligent appliance.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
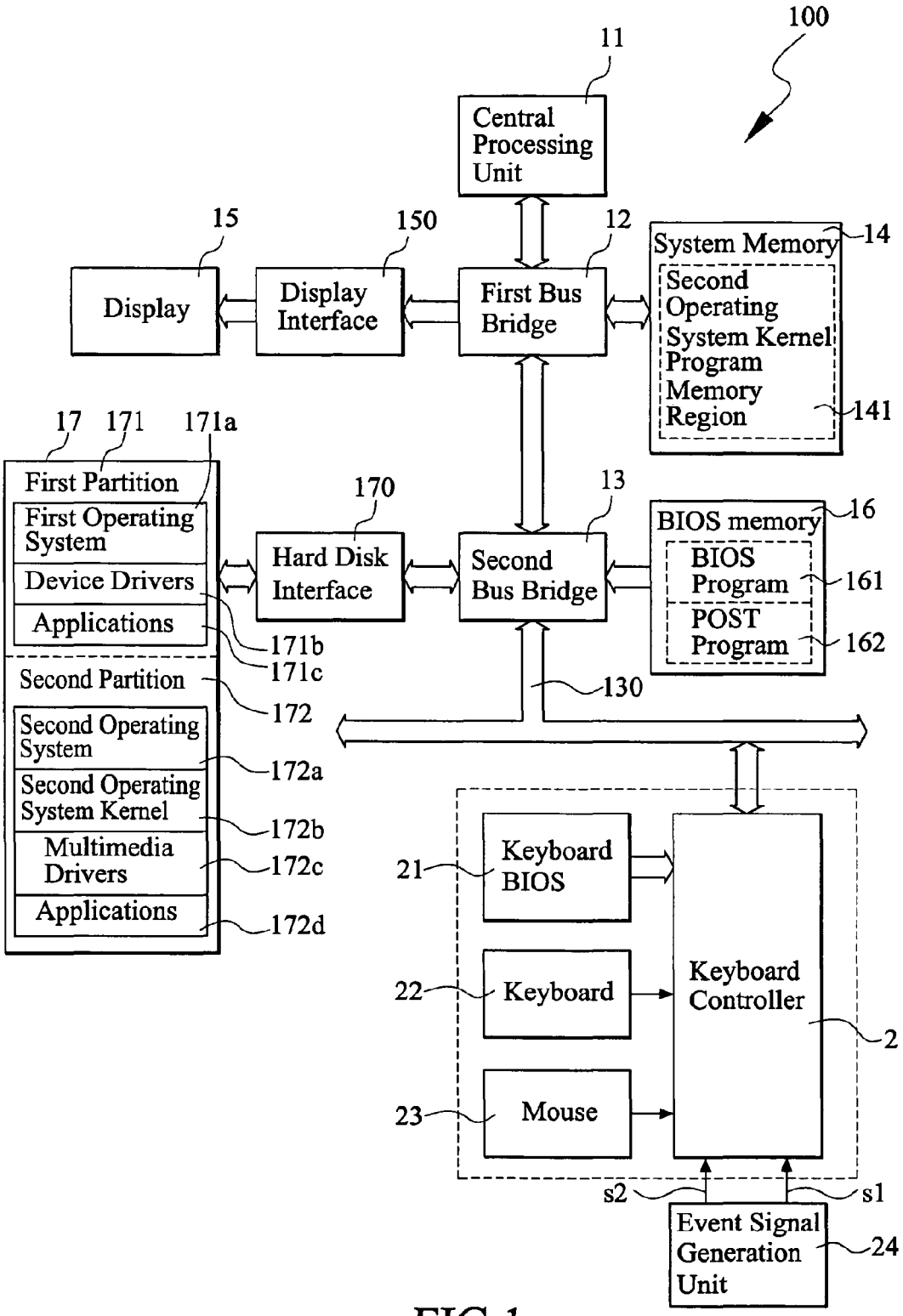
FIG. 1 is a system functional block diagram in accordance with the present invention.

With reference to the drawings and in particular to FIG. 1, which shows a system functional block diagram of a first embodiment in accordance with the present invention, a computer 100 comprises a central processing unit (CPU) 11, a first bus bridge 12, and a second bus bridge 13. The central processing unit 11 is connected to the first bus bridge 12 through a system bus. The first bus bridge 12 is connected to a system memory 14 and is connected to a display 15 through a display interface 150.

The second bus bridge 13 is connected to a BIOS memory 16. The BIOS memory 16 stores a BIOS program 161 and a power on self test (POST) program 162, both required for booting the computer.

The second bus bridge 13 is connected to a hard disk interface 170 through a bus. The hard disk interface 170 is connected to a hard disk 17. The hard disk 17 serves as a data storage for the computer 100. The hard disk 17 is divided into a first partition 171 and a second partition 172. The first partition 171 is installed with a first operating system 171a. The operating system 171a can be a known Windows operating system. When the computer 100 is booted with the first operating system 171a, the computer 100 operates under the first operating system 171a. The first partition 171 is also installed with various device drivers 171b and applications 171c required for the computer 100 to operate.

The second partition 172 of the hard disk 17 stores a second operating system 172a and a second operating system kernel program 172b. The second operating system 172a can be a Linux-based operating system or other types of operating systems, such as Tiny Windows-based operating system or embedded operating system.

The second partition 172 also stores multimedia drivers 172c and applications 172d operating under the second operating system 172a. In actual applications, the multimedia drivers 172c and the applications 172d include drivers and applications for CD, digital music device, VCD, TV signal receiver, and so on.

The second bus bridge 13 of the computer 100 is connected to a keyboard controller 2 through a bus 130. The keyboard controller 2 is connected to a keyboard BIOS 21, a keyboard 22, and a mouse 23.

The keyboard controller 2 is connected to an event signal generation unit 24. The event signal generation unit 24 comprises at least a button or an element capable of generating an operation signal. Under the user's operation, the event signal generation unit 24 generates a first event signal s1 of multimedia playing mode to the keyboard controller 2, and a second event signal s2 of normal computer operation mode to the keyboard controller 2. The first and second event signals s1 and s2 can also be generated by pressing a pre-defined key of the keyboard 22.

In actual applications, the event signal generation unit 24 can be defined as a control key for fast activating a default multimedia player. The event signal generation unit 24 can be installed on the panel of the corresponding multimedia player, a button on the computer, or a button on a remote control.

Figure 2:
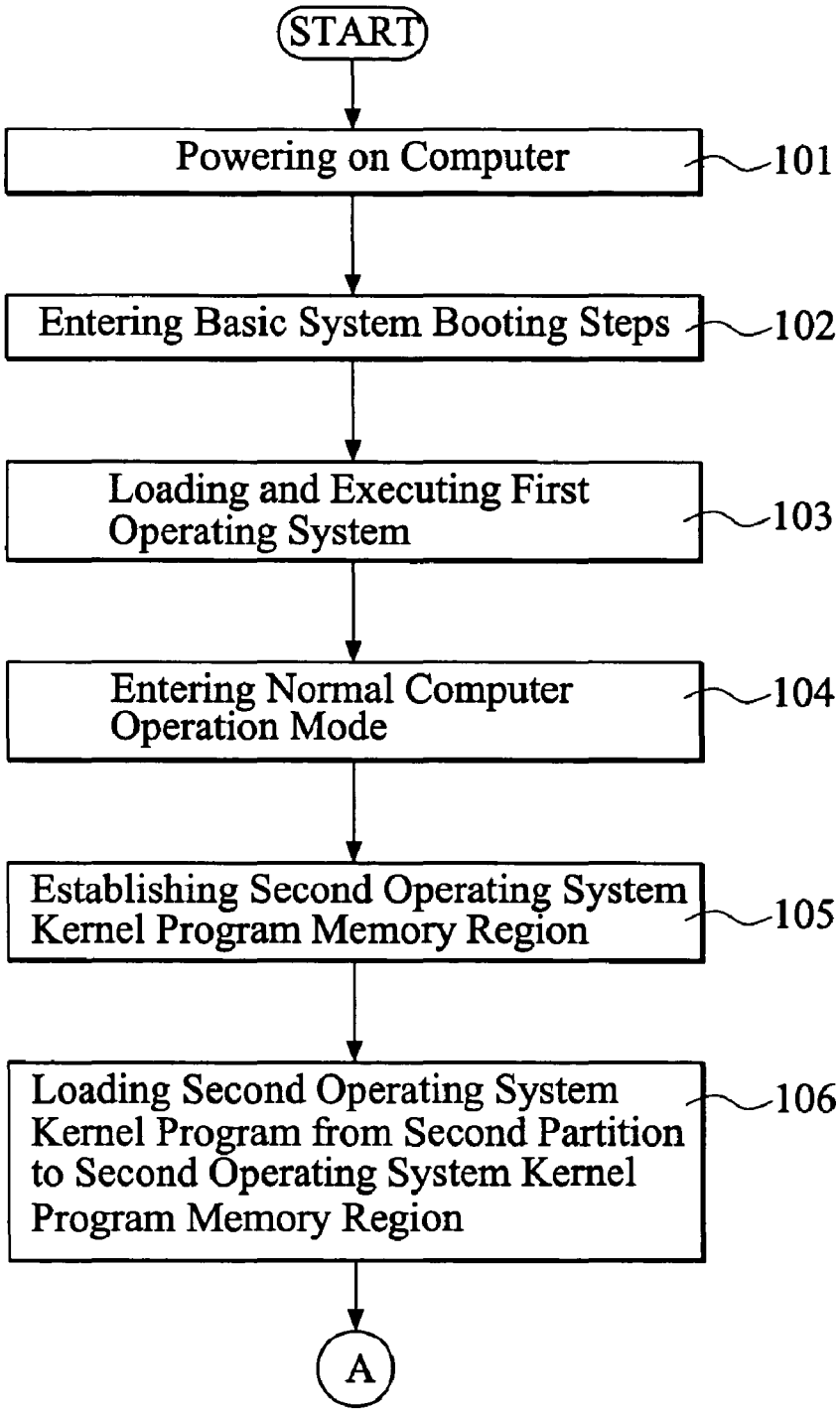
FIG. 2 is the first part of the control flowchart of a first embodiment.
Figure 3:
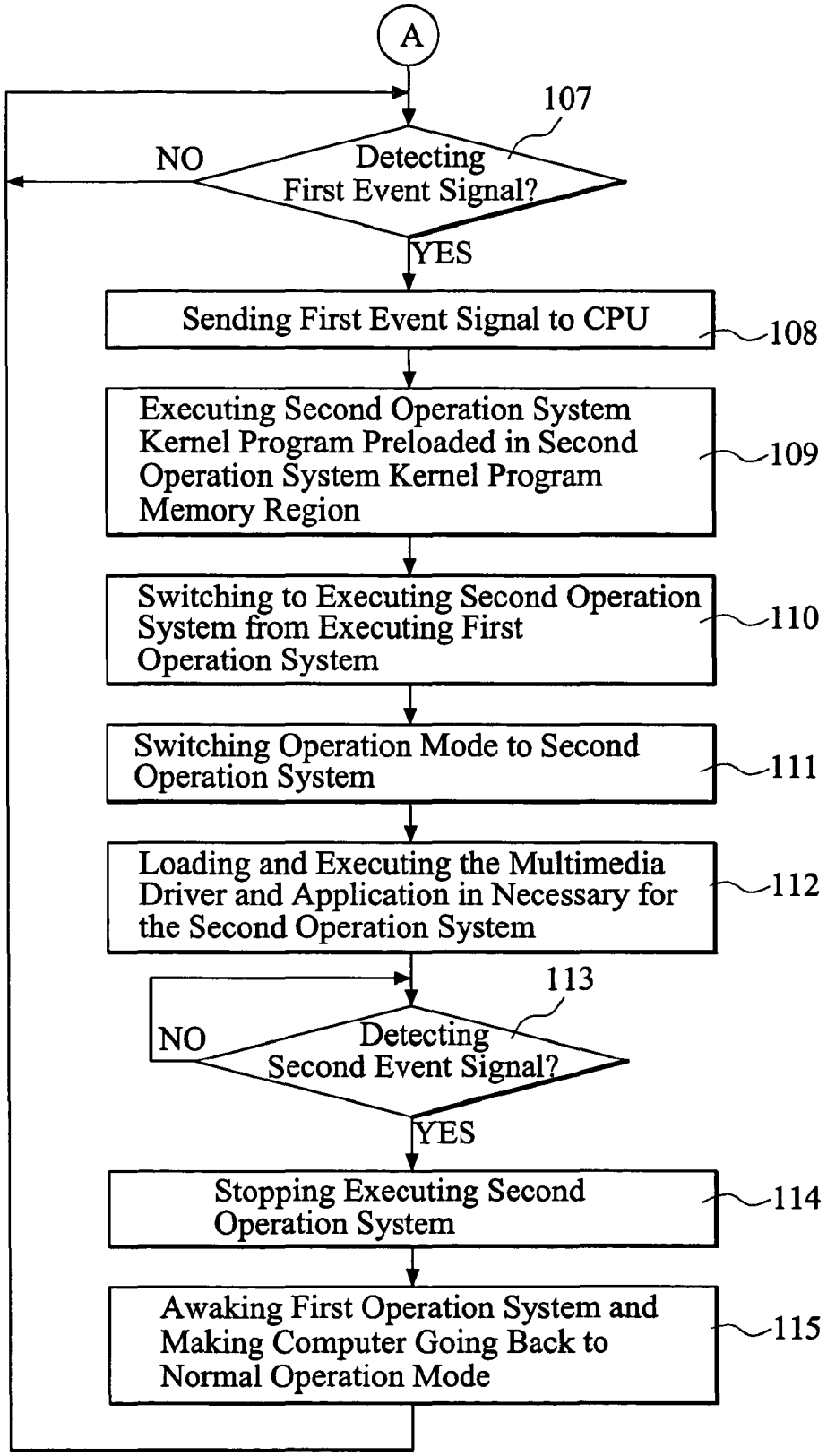
FIG. 3 is the second part of the control flowchart of the first embodiment.

FIGS. 2 and 3 show a control flowchart of the embodiment in FIG. 1. The following detail description refers to FIGS. 1, 2 and 3.

When the computer 100 is powered on (step 101), the computer 100 enters a series of basic system booting procedures (step 102). That is, the computer 100 loads and executes the BIOS program 161 and the POST program 162 from the BIOS memory 16. Then, the computer 100 loads and executes the first operating system 171a of the first partition 171 of the hard disk 17 (step 103), and then the computer 100 enters a normal computer operation mode (step 104).

After loading and executing the first operating system 171a, the computer 100 establishes a second operating system kernel program memory region 141 in the system memory 14 (step 105), and loads the second operating system kernel program 172b from the second partition 172 of the hard disk 17 to the second operating system kernel program memory region 141 (step 106) with a protected mode to reside the second operating system kernel program 172b in the system memory 14. The second operating system kernel program 172b can be stored in a compressed format to save the space required in the second operating system kernel program memory region 141.

When the computer is operated in the normal operation mode, it can detect whether the first event signal s1 is generated (step 107). That is, when the user presses the event signal generation unit 24 or a pre-defined hot key of the keyboard 22, the first event signal s1 is detected by the keyboard controller 2 and sent to the central processing unit 11 of the computer 100 (step 108).

When the central processing unit 11 receives the first event signal s1, the second operation system kernel program 172b preloaded in the second operation system kernel program memory region 141 is executed (step 109), and switches the computer 100 to executing the second operation system 172a (step 110) from executing the first operation system 171a. After that, the operation mode of the computer is switched from the first operation system 171a to the second operation system 172a (step 111). Thus, the user can switch the computer 100 to execute the second operation system 172a when he in need, and progressively achieves the object and efficiency of fast switching.

After completing the step of switching the computer 100 from executing the first operation system 171a to executing the second operation system 172a, the computer 100 can load and execute the multimedia driver 172c and application 172d in necessary for the second operation system 172a (step 112).

If the second event signal s2 is detected (step 113) after operating the computer 100 in the second operation system 172a, the computer stops executing the second operation system kernel program 172b, and stops executing the multimedia driver 172c and the application 172d operated under the second operation system 172a (step 114). Then the first operation system 171a is awaked to make the computer 100 going back to the normal operation mode (step 115). Thus, the computer 100 can fast switching back to the first operation system 171a without rebooting the first operation system 171a.

In actual application, the second operation system 172a is designed for controlling the executing of the household appliance and multimedia playing device, such as CD player, digital music device, VCD, TV signal receiver, etc. Except for that the user can choose operating the computer 100 in the normal operation mode, the user also can fast switch the computer between executing the functions of multimedia playing devices and household appliances.

In the first embodiment of the present invention as above description, the operation sequence of the computer 100 after booting process is loading and executing the first operation system 17a, detecting the event signals, loading and executing the second operation system 172a, and switching back to executing the first operation system 171a. In actual applications, the operation sequence of the computer after booting process also may be loading and executing the second system 172a, detecting the event signals, executing the second operation system 172a, and switching back to the first operation system 171a.

Figure 4:
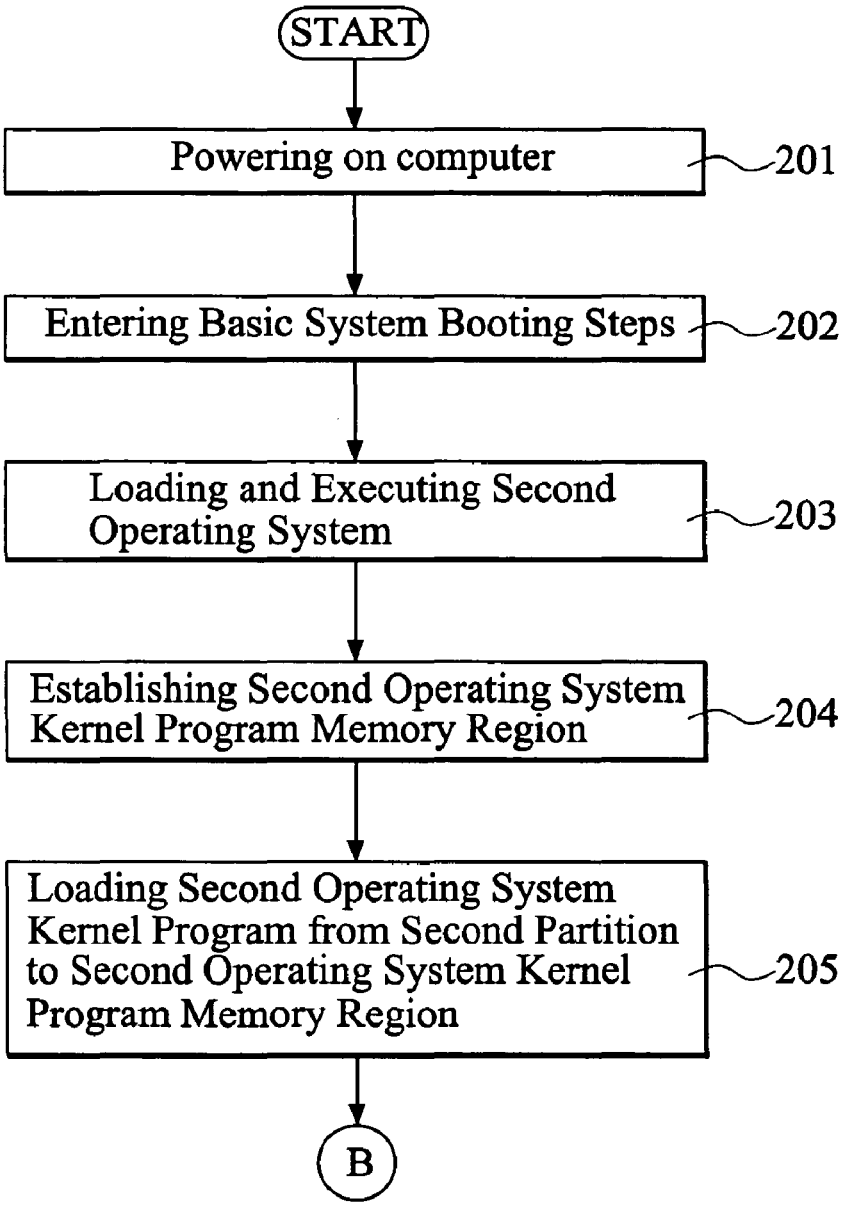
FIG. 4 is the first part of the control flowchart of a second embodiment.
Figure 5:
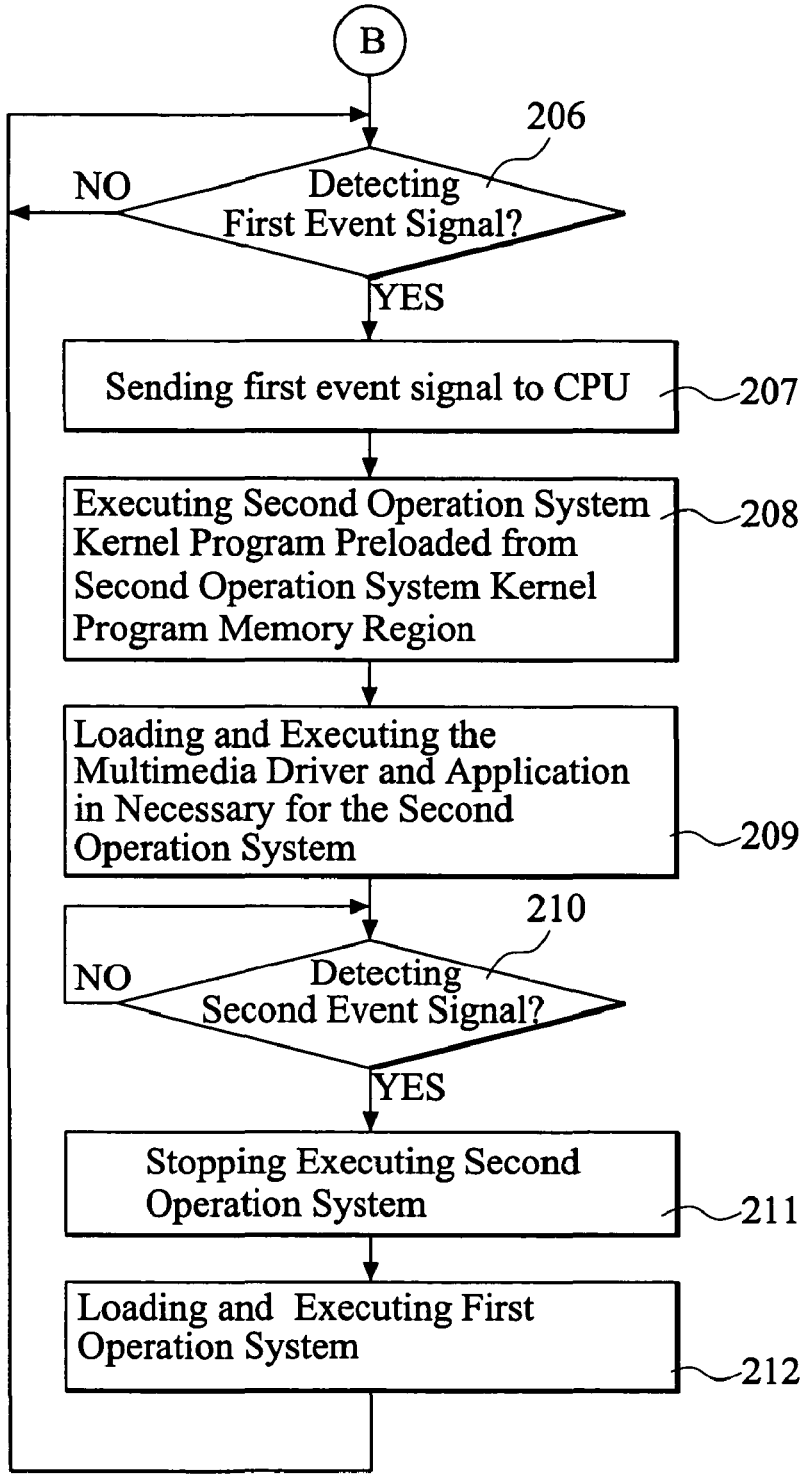
FIG. 5 is the second part of the control flowchart of the second embodiment.

Please refer to FIG. 4 and FIG. 5, those shows a system functional block diagram of a second embodiment in accordance with the present invention. When the computer 100 is powered on (step 201), the computer 100 enters the basic system booting steps (step 202). Meanwhile, the computer 100 loads and executes the BIOS program 161 and the POST program 162 from the basic input output system memory 16. Then, the computer 100 loads and executes the second operating system 172a of the first partition 172 of the hard disk 17 (step 203).

After loading and executing the second operating system 172a, the computer 100 establishes a second operating system kernel program memory region 141 in the system memory 14 (step 204), and loads the second operating system kernel program 172b from the second partition 172 of the hard disk 17 to the second operating system kernel program memory region 141 (step 205) with a protected mode to reside in the system memory 14.

When the computer 100 operates under the second operation system 172a, whether the first event signal s1 is generated is detected (step 206), i.e., when the user presses the event signal generation unit 24 or a pre-defined key of the keyboard 22, the first event signal s1 is detected by the keyboard controller 2 and sent to the central processing unit 11 of the computer 100 (step 207).

When the central processing unit 11 receives the first event signal s1, the second operation system kernel program 172b preloaded in the second operation system kernel program memory region 141 is executed (step 208).

After completing above steps, the computer 100 can load and execute the multimedia driver 172c and the application 172d in necessary for the second operation system 172a (step 209).

If the second event signal s2 is detected when the computer 100 operates under the second operation system 172a (step 210), the computer 100 stops executing the second operation system 172a (step 211). That is, the computer 100 stops executing the second operation system kernel program 172b, and stops executing the multimedia driver 172c and the application 172d operated under the second operation system 172a.

Then, the computer 100 loads and executes the first operation system 171a of the first partition 171 of the hard disk 17 (step 212), so that the computer 100 can enter the first operation system. According to above description, the computer 100 also can be switched to execute any operation system between different operation systems.

While the invention has been described in connection with what is presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. A method of fast switching control for different [operation] *operating* systems pre-installed in a computer with a [hard disk] *storage*, a system memory, a basic input output system and an event signal generation unit, the [hard disk] *storage* at least stored with a first [operation] *operating* system, a second [operation] *operating* system and a second [operation] *operating* system kernel program, and wherein the event signal generation unit is a user operated element for generating event signals for switching between the first and second [operation] *operating* systems, the method comprising the following steps:

(a) completing a basic system booting process of the computer;

(b) loading and executing the first [operation] *operating* system [in] *from* the [hard disk] *storage*;

(c) establishing a second operating system kernel [diagram] *program* memory region in the system memory;

(d) loading the second [operation] *operating* system kernel program from the [hard disk] *storage* into the second operating system kernel [diagram] *program* memory region without starting execution of the second [operation] *operating* system and without stopping execution of the first operating system;

(e) detecting whether the event signal generation unit generates a preset first event signal by operation of the user;

(f) executing the second [operation] *operating* system kernel program preloaded in the second [operation] *operating* system kernel program memory region when the first event signal is detected; and (g) switching the computer from executing the first [operation] *operating* system to executing the second [operation] *operating* system.

2. The method as claimed in claim 1, wherein the [hard disk] *storage* is divided into a first partition and a second partition, with the first partition installed with the first operating system, and the second partition installed with the second operating system and the second [operation] *operating* system kernel program.

3. The method as claimed in claim 2, wherein the first [operation] *operating* system is a windows [operation] *operating* system and the second *operating system* is an embedded [operation] *operating* system.

4. The method as claimed in claim 2, wherein the [second partition] *storage also* stores at least one device driving program and application program adapted to supporting the second [operation] *operating* system.

5. The method as claimed in claim 1, further comprising the following steps after step (g):

(h) detecting whether the event signal generation unit generates a preset second event signal by operation of the user;

(i) stopping executing the second [operation] *operating* system when the second event signal is detected; and (j) awaking the first [operation] *operating* system and switching the computer to execute the first [operation] *operating* system.

*6. A method of fast switching control for different operating systems in a computer with a first memory, a basic input output system and an event generation unit, wherein the event generation unit is a user operated element for generating events for switching between a first operating system and a second operating system, the method comprising:*

*loading and executing the first operating system;*

*establishing a second operating system kernel program memory region in the first memory;*

*loading the second operating system kernel program into the second operating system kernel program memory region without starting execution of the second operating system and without stopping execution of the first operating system;*

*detecting whether the event generation unit generates a first event by operation of the user;*

*executing the second operating system kernel program preloaded in the second operating system kernel program memory region when the first event is detected; and*

*switching the computer from executing the first operating system to executing the second operating system.*

*7. The method as claimed in claim 6, wherein the first operating system is a windows operating system and the second operating system is an embedded operating system.*

*8. The method as claimed in claim 6, further comprising:*

*detecting whether the event generation unit generates a second event by operation of the user;*

*stopping executing the second operating system when the second event is detected; and*

*awaking and executing the first operating system.*

*9. A system for controlling a plurality of operating systems, comprising:*

*a storage storing a first operating system, a second operating system, and a second operating system kernel program;*

*a system memory;*

*a generation unit that generates signals for switching between the first and second operating systems based on user operation; and*

*a processor configured to:*

*load the first operating system from the storage;*

*execute the first operating system;*

*establish a memory region in the system memory;*

*load the second operating system kernel program from the storage into the memory region without starting execution of the second operating system and without stopping execution of the first operating system;*

*detect whether the generation unit generates a preset first event signal by operation of a user;*

*execute the second operating system kernel program in response to the first event signal generated by the generation unit; and*

*switch from executing the first operating system to executing the second operating system.*

*10. The system as claimed in claim 9, wherein the storage is divided into a first partition and a second partition, with the first partition installed with the first operating system, and the second partition installed with the second operating system and the second operating system kernel program.*

*11. The system as claimed in claim 10, wherein the first operating system is a windows operating system and the second is an embedded operating system.*

*12. The system as claimed in claim 10, wherein the second partition stores at least one device driving program and application program adapted to supporting the second operating system.*

*13. The system as claimed in claim 9, the processor further configured to:*

*detect whether the generation unit generates a second event signal;*

*stop executing the second operating system when the second event signal is detected; and*

*awake and execute the first operating system.*

*14. A system for controlling a plurality of operating systems, comprising:*

*a first operating system;*

*a second operating system;*

*a system memory;*

*an event generation unit that generates events for switching between the first and second operating systems based on operation of a user; and*

*a processor configured to:*

*load and execute the first operating system;*

*establish a second operating system kernel program memory region in the system memory;*

*load the second operating system kernel program into the second operating system kernel program memory region without starting execution of the second operating system and without stopping execution of the first operating system;*

*detect whether the event generation unit generates a preset first event by operation of the user;*

*execute the second operating system kernel program when the first event is detected; and*

*switch from executing the first operating system to executing the second operating system.*

*15. The system as claimed in claim 14, wherein the first operating system is a windows operating system and the second operating system is an embedded operating system.*

*16. The system as claimed in claim 14, the processor further configured to:*

*detect whether the event generation unit generates a second event;*

*stop executing the second operating system when the second event is detected; and*

*awake and execute the first operating system.*

*17. A method of switching control for different operating systems in a computer including a storage, a system memory, a basic input output system and an event signal generation unit, the storage including a first operating system, a second operating system and a second operating system kernel program, and wherein the event signal generation unit is a user operated element for generating event signals for switching between the first and second operating systems, the method comprising:*

*loading the first operating system from the storage;*

*executing the first operating system;*

*establishing a second operating system kernel program memory region in the system memory;*

*loading the second operating system kernel program from the storage into the second operating system kernel program memory region without starting execution of the second operating system and without stopping execution of the first operating system;*

*detecting whether the event signal generation unit generates a preset first event signal by operation of the user;*

*executing the second operating system kernel program preloaded in the second operating system kernel program memory region when the first event signal is detected; and*

*switching from executing the first operating system to executing the second operating system when the first event signal in detected.*

*18. A system configured to control a plurality of operating systems, comprising:*

*a storage storing a first operating system, a second operating system, and a second operating system kernel program;*

*a system memory; and*

*processor configured to:*

*load the first operating system from the storage;*

*execute the first operating system;*

*establish a second operating system kernel program memory region in the system memory;*

*load the second operating system kernel program from the storage into the second operating system kernel program memory region without starting execution of the second operating system and without stopping execution of the first operating system;*

*detect a first event associated with an operation of the user and generated by an event signal generation unit;*

*execute the second operating system kernel program preloaded in the second operating system kernel program memory region when the first event is detected; and*

*switch from executing the first operating system to executing the second operating system based on the detected first event.*

* * * * *